United States Patent [19]

Gray

[11] Patent Number: 5,126,885

[45] Date of Patent: Jun. 30, 1992

[54] CONTROL DEVICE FOR ELECTRICALLY CONTROLLED REARVIEW MIRROR

[75] Inventor: Philip H. Gray, St-Anne-de-Bellevue, Canada

[73] Assignee: Westech Innovations Inc., Baie D'Urfe, Canada

[21] Appl. No.: 539,331

[22] Filed: Jun. 18, 1990

[51] Int. Cl.⁵ .............................................. G02B 5/08
[52] U.S. Cl. .................... 359/841; 359/843; 359/844
[58] Field of Search ............... 350/604, 605, 606, 636, 350/637; 248/900; 340/309

[56] References Cited

U.S. PATENT DOCUMENTS

| | | | |
|---|---|---|---|
| 4,318,590 | 3/1982 | Hanley | 350/289 |
| 4,632,525 | 12/1986 | Hayashi et al. | 350/634 |
| 4,640,590 | 2/1987 | Wunsch | 350/632 |
| 4,678,295 | 7/1987 | Fisher | 350/634 |
| 4,727,302 | 2/1988 | Mizuta et al. | 350/637 |
| 4,792,220 | 12/1988 | Janowicz | 350/637 |
| 4,798,967 | 1/1989 | Yamana et al. | 350/637 |
| 4,834,522 | 5/1989 | Janowicz | 350/637 |
| 4,981,347 | 1/1991 | Nakayama | 350/604 |

FOREIGN PATENT DOCUMENTS

| | | | |
|---|---|---|---|
| 58-126232 | 7/1983 | Japan | 350/606 |
| 59-195451 | 6/1984 | Japan | |
| 60-215444 | 10/1985 | Japan | 350/637 |
| 61-218452 | 9/1986 | Japan | 350/604 |

Primary Examiner—Paul M. Dzierzynski
Assistant Examiner—Hung Xuan Dang
Attorney, Agent, or Firm—Foley & Lardner

[57] ABSTRACT

There is disclosed a control device for use with at least one electrically controlled rearview mirror apparatus, each apparatus having a motor for angularly moving a rearview mirror about at least one axis, and position adjustment means for allowing an operator to adjust an initial position of the mirror, the device being able to move the mirror from the initial position to a blind spot position and to return the mirror substantially to the initial position and comprising: an activating switch for providing a start signal in response to the operator; a timer; switching relays for controlling the motor to move the mirror in a path between the initial and blind spot position; and a controller for controlling a movement cycle of the mirror, the movement cycle being initiated by the start signal, the controller causing the switching relays to move the mirror along the path for a first time period as determined by the timer so as to move the mirror between the initial and blind spot positions, to stop the mirror for a second time period as determined by the timer, and to move the mirror for a third period of time as determined by the timer so as to return the mirror from the blind spot position to the initial position. The device allows for blind spot scanning without adding to the mechanical control system of the side rearview mirror apparatus.

18 Claims, 3 Drawing Sheets

CONTROL DEVICE FOR ELECTRICALLY CONTROLLED REARVIEW MIRROR

FIELD OF THE INVENTION

The present invention relates to a control device for use with an electrically controlled rearview mirror apparatus to temporarily shift a rear view mirror to a wider viewing angle position. The invention relates further to a control device which uses a timer to time a duration during which an electrically controlled rearview mirror is moved from an initial position to a blind spot position and then from the blind spot position to substantially the initial position.

It is well known that rearview mirrors have the disadvantge of leaving the driver of a vehicle with a blind spot between the field of view of the mirror and the beginning of a driver's peripheral vision. Objects such as motor vehicles in the blind spot cannot be seen by the driver, creating the potential for a serious accident while changing lanes or merging with traffic. One common method for overcoming this problem is for the driver to glance over his shoulder at the blind spot to check for other vehicles. An obvious drawback of this method is that the driver is not watching wherein he is going for a short period of time. Another proposed solution has been the use of convex mirrors to effectively eliminate the blind spot. However convex mirrors produce a considerable amount of image distortion and make objects look farther away than they really are. This can be more dangerous than having a blind spot, since the driver is lured into a false sense of security.

Various devices have been devised to cause side rearview mirrors to scan the blind spot. U.S. Pat. No. 4,318,590 (Hanley) describes a side rearview mirror provided with a solenoid to electromechanically shift the angle of the mirror. U.S. Pat. No. 4,632,525 (Hayashi) describes a side mirror driving apparatus comprising secondary motors which can engage to shift the position of the mirror. U.S. Pat. No. 4,640,590 (Wunsch) describes a cam shaft rocking mechanism. U.S. Pat. No. 4,678,295 (Fisher) describes a rearview side mirror having position sensors with memory capability. U.S. Pat. Nos. 4,792,220 and 4,834,522 (Janowicz) describe mirror control systems for blind spot checking wherein the mirror moves between two limit switches. The Japanese patent application 58-69324 to NISSAN describes an electronic control system for moving side mirrors to a preset position. These devices all require an addition to the mechanical mirror control system.

SUMMARY OF THE INVENTION

It is therefore an object of the present invention to provide a control device for use with an electrically controlled rearview mirror which does not require an addition to the mechanical mirror system.

It is a further object of the present invention to provide a control device for an electrically controlled rearview mirror which can be inexpensively installed into an existing electrically controlled rearview mirror apparatus.

According to the invention, there is provided a controlled device for use with at least one electrically controlled rearview mirror apparatus, each apparatus having motor means for angularly moving a rearview mirror about at least one axis, and position adjustment means for allowing an operator to adjust an initial position of the mirror, the device being able to move the mirror from the initial position to a blind spot position and to return the mirror substantially to the initial position. The control device comprises: activating means for providing a start signal in response to the operator; timer means; switching means for controlling the motor means to move the mirror in a path between the initial and blind spot positions; and control means for controlling a movement cycle of the mirror, the movement cycle being initiated by the start signal, the control means causing the switching means to move the mirror along the path for a first time period as determined by the timer means so as to move the mirror between the initial and blind spot positions, to stop the mirror for a second time period as determined by the timer means, and to move the mirror for a third period of time as determined by the timer means so as to return the mirror from the blind spot position to the initial position.

Preferably, the control device further comprises means to disactivate the position adjustment means during the movement cycle and to reactivate the position adjustment means when the movement cycle is finished.

Also, the invention may preferably provide a control device for use with two electrically controlled rearview mirror apparatus providing a right and left apparatus, wherein the switching means control the motor means of each of the left and right apparatus simultaneously.

DETAILED DESCRIPTION OF THE PREFERRED EMBODIMENT

Figure 1:
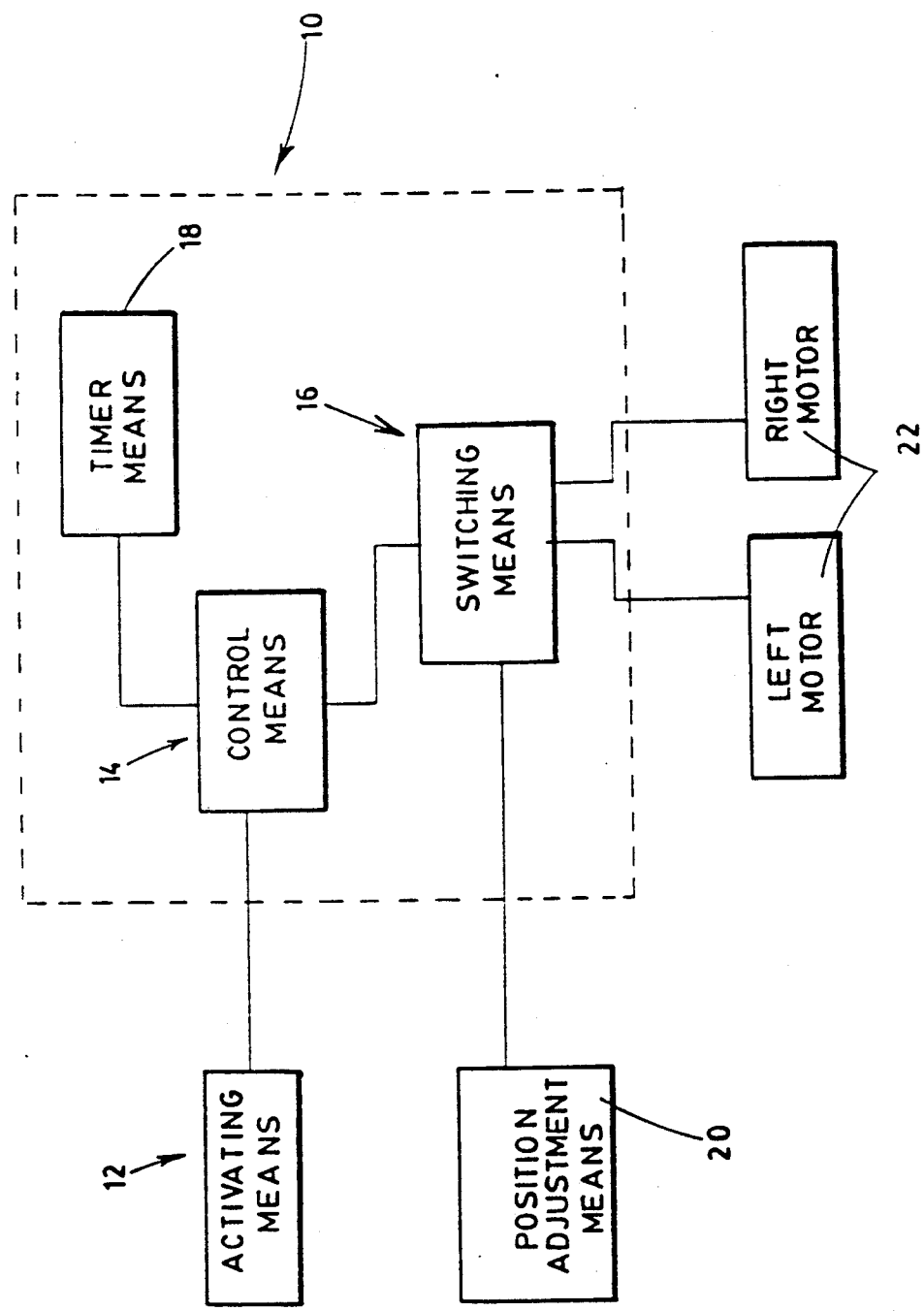
FIG. 1 shows a blocked diagram of the control device according to a preferred embodiment.

With reference to FIG. 1, the control device according to the preferred embodiment comprises a circuit 10 including control means 14, timer means 18 and switching means 16. The switching means 16 are spliced into the electrical connections between position adjustment means 20 and motor means 22. The activating means 12 which comprise either a push button or voice activated switch provide a start signal to the control means in response to the operator.

Figure 2:
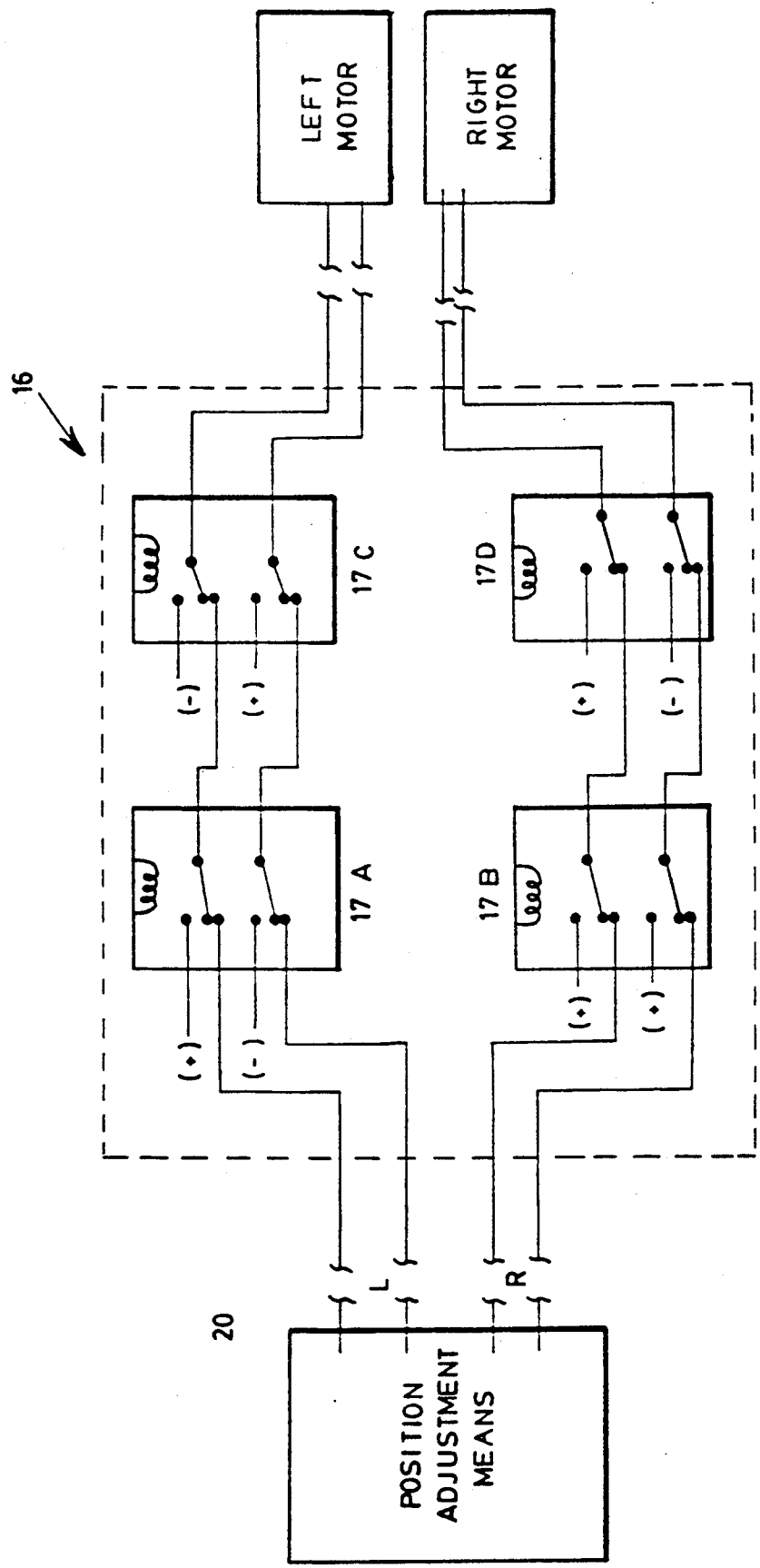
FIG. 2 shows a block schematic of the switching means according to the preferred embodiment.

Circuit 10 is provided on a printed circuit board in a small box to be installed under the dash of an automobile. The cables running between the mirror adjustment switches acting as position adjustment means 20 and the left and right exterior side rearview mirror motors 22 are spliced in with switching means 16 which include four double pull double throw relays 17, as shown in FIG. 2, a first 17A and a second 17B of which are connected to the motors 22 of the left and right apparatus respectively, the first 17A and second 17B relays providing electric power to move the mirrors of the two apparatus towards the blind spot, and a third 18C and fourth 17D of which are connected to the motors of the left and right apparatus respectively, the third and fourth relays providing electric power to substantially return the mirrors of the two apparatus to the initial position. The same relays are used to disable the position adjustment means 20 during a movement cycle of the mirrors. When the movement cycle is finished, the relays of the switching means 16 connect the position adjustment means 20 to the left and right motor means 22 in their conventional fashion. The left and right motor means 22 are connected to side rearview mirrors (not shown in FIG. 1) on the left and right side respectively of the automobile.

Figure 3:
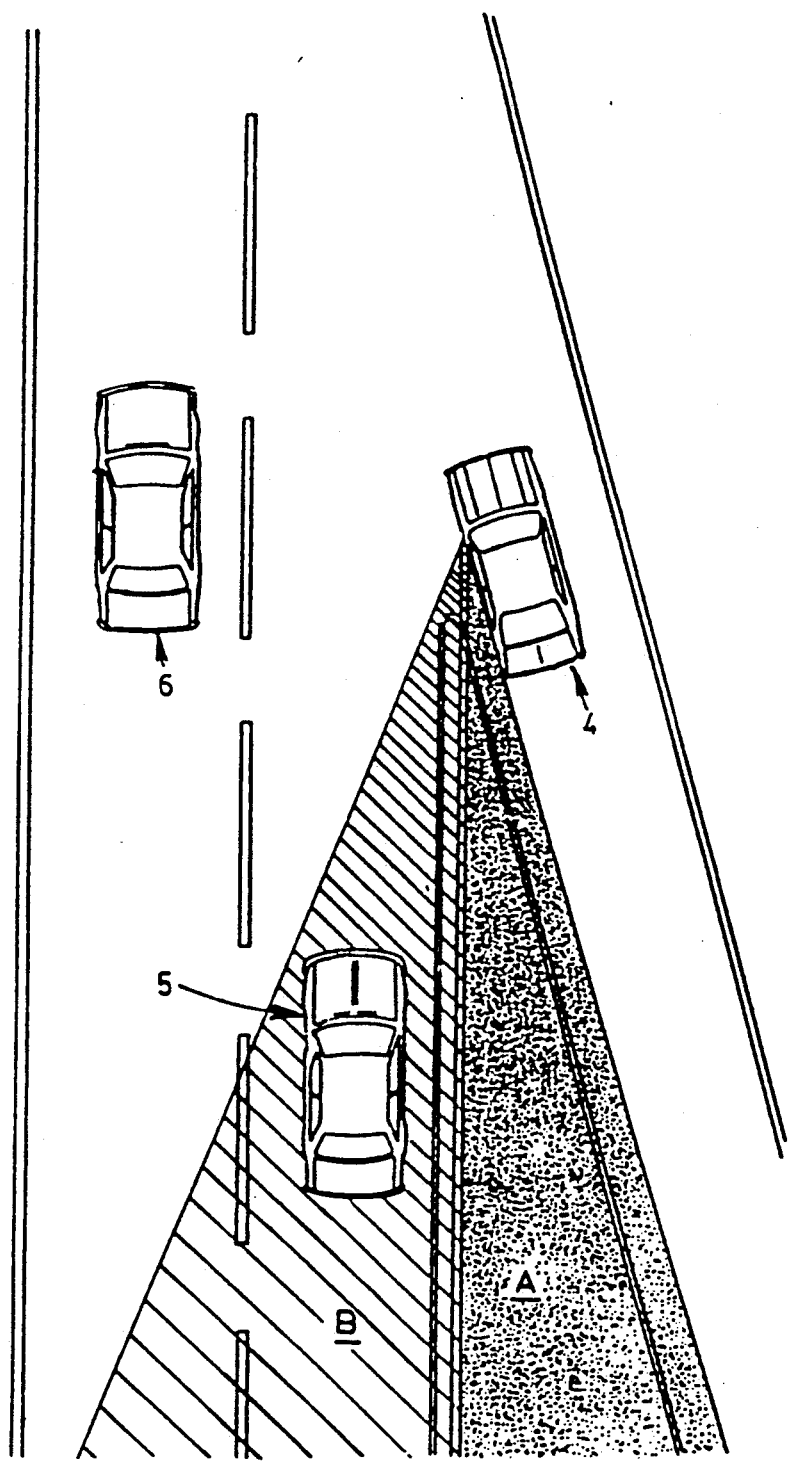
FIG. 3 shows a plan view of merging travic and the blind spot of a merging vehicle.

The operation of the controlled device will now be described. When an operator or a driver of an automobile wishes to merge into traffic as shown in FIG. 3, it is desirable to be able to see using the side rearview mirror blind spot B instead of the regular zone of view A. The operator or driver of car 4 causes the activating means to generate the start signal by either pressing a push button located on the dash, the floor panel, the steering column or on the lower console, or by making a given sound to activate a voice activated switch. Once the start signal is generated by the activating means 12, control means 14 begin the movement cycle. The control means begins the movement cycle by activating the switching means to cause the left and right electric motors to be switched on to move in the outwards direction for a time period of one second during which the field of view of the rearview mirror on the left-hand side moves from zone A to zone B as shown in FIG. 2. After one second of movement, the mirrors reach the blind spot position and the operator of car 4 is able to see car 5 in the blind spot without turning his head. Other traffic represented by car 6 remains in the view of the driver of car 4. The driver of car 4 is able to make a safe judgement as to whether he should continue merging or not. A second time period during which the left and right motor means 22 are stopped by the switching means 16 is not used in the preferred embodiment, and instead the control means switch power to the left and right motor means 22 to move in the inwards direction for a third time period which is set to the same as the first time period of one second. After one second of inward movement, the left and right motor means 22 have reached substantially their initial position and switching means 16 cuts power to the motor means 22. Control of the initial position of the left and right motor means 22 is restored by switching means 16 to the position adjustment means 20.

Of course, in the preferred embodiment the turning of the mirrors by the left and right motor means 22 occurs only about a vertical axis to change the field of view to different angles in the horizontal plane. It is of course possible to control more than one direction of the left and right motor means 22 to scan a different field of view as required.

The use of a selected key word such as "PAN" can be used to activate a voice activated device of the activating means 12. In this case, the activating means 12 can be provided as part of the circuit box 10 and the simplicity of installation of the invention into an automobile is improved.

Of course if the speed of movement of the motor means 22 is not the same in any given direction or on any given side of the automobile, the control means 14 will cause each motion of the left and right motor means 22 to take place during a given required time period as determined by the timer means 18 such that the motor means move the mirrors from the initial position to the blind spot position and substantially back to the initial position.

The second time period being the pause during which the mirrors are left in the blind spot position may be increased from zero to about one second as desired.

It has been determined that for most electric side rearview mirrors, a period of one second is sufficient to move the mirror from an initial position to the blind spot position.

To reduce the consumption of electrical power by circuit 10 when not in use, it is preferable to provide the control means with power in response to the start signal and to interrupt power to circuit 10 when the movement cycle is finished, such that power consumption and cooling problems of circuit 10 are avoided.

It is to be understood that the above description of the preferred embodiment is not intended to limit the scope of the present invention as defined in the appended claims.

What is claimed is:

1. A control device for use with at least one electrically controlled rearview mirror apparatus, each apparatus having motor means for angularly moving a rearview mirror about at least one axis, and position adjustment means for allowing an operator to adjust an initial position of the mirror, the device being able to move the mirror from the initial position to a blind spot position and to return the mirror substantially to the initial position, and comprising:

activating means for providing a start signal in response to the operator;

timer means;

switching means for controlling the motor means to move the mirror in a path between the initial and blind spot positions; and control means for controlling a movement cycle of the mirror, the movement cycle being initiated by the start signal, the control means causing the switching means to move the mirror along said path for a first time period as determined by the timer means so as to move the mirror between the initial and blind spot positions, to stop the mirror for a second time period as determined by the timer means, and to move the mirror for a third period of time as determined by the timer means so as to return the mirror from the blind spot position to the initial position.

2. The control device as defined in claim 1, further comprising means with the control means to deactivate the position adjustment means during the movement cycle and to reactivate the position adjustment means when the movement cycle is finished.

3. The control device as defined in claim 2, for use with two electrically controlled rearview mirror apparatus providing a left and a right apparatus, wherein the switching means control the motor means of each said left and right apparatus simultaneously.

4. The control device as defined in claim 2, wherein the activating means comprise a push button.

5. The control device as defined in claim 2, wherein the activating means comprise a voice activated device providing the start signal in response to an operator activated sound.

6. The control device as defined in claim 2, wherein the timer means has the the second time period set to zero, whereby the mirror is not held at the blind spot position by the control means.

7. The control device as claimed in claim 2, wherein the first and third time periods are equal, a speed of angular motion of the motor means being substantially equal in moving either from the initial to the blind spot positions or from the blind spot to the initial positions.

8. The control device as defined in claim 2. wherein the first and third time periods are approximately one second.

9. The control device as defined in claim 2, wherein the control means, the timer means and the switching means are only provided with power in response to the start signal and during said movement cycle, whereby the device uses little or no electrical power when not in use.

10. The control device as defined in claim 2, wherein the motor means of each mirror apparatus include an electric sideways motor, and the switching means comprise four double pull double throw relays, a first and a second of which are connected to the motors of the left and right apparatus respectively, the first and the second relays providing electric power to move the mirrors of the two apparatus towards the blind spot, and a third and a fourth of which are connected to the motors of the left and right apparatus respectively, the third and the fourth relays providing electric power to substantially return the mirrors of the two apparatus to the initial position.

11. The control device as defined in claim 1, for use with two electrically controlled rearview mirror apparatus providing a left and a right apparatus, wherein the switching means control the motor means of each said left and right apparatus simultaneously.

12. The control device as defined in claim 11, wherein the motor means of each mirror apparatus include an electric sideways motor, and the switching means comprise four double pull double throw relays, a first and a second of which are connected to the motors of the left and right apparatus respectively, the first and the second relays providing electric power to more the mirrors of the two apparatus towards the blind spot. and a third and a fourth of which are connected to the motors of the left and right apparatus respectively, the third and the fourth relays providing electric power to substantially return the mirrors of the two apparatus to the initial position.

13. The control device as defined in claim 1. wherein the activating means comprise a push button.

14. The control device as defined in claim 1, wherein the activating means comprise a voice activated device producing the start signal in response to an operator activated sound.

15. The control device as defined in claim 1, wherein the timer means has the second time period set to zero, whereby the mirror is not held at the blind spot position by the control means.

16. The control device as claimed in claim 1, wherein the first and third time periods are equal, a speed of angular motion of the motor means being substantially equal in moving either from the initial to the blind spot positions or from the blind spot to the initial positions.

17. The control device as defined in claim 16, wherein the first and third time periods are approximately one second.

18. The control device as defined in claim 1, wherein the control means, the timer means and the switching means are only provided with power in response to the start signal and during said movement cycle, whereby the device uses little or so electrical power when not in use.

* * * * *